July 22, 1924.

H. G. RENNER

RIVETABLE NUT

Filed May 14, 1923

1,502,399

Inventor
Harold G. Renner.

By

Patented July 22, 1924.

1,502,399

UNITED STATES PATENT OFFICE.

HAROLD G. RENNER, OF DETROIT, MICHIGAN.

RIVETABLE NUT.

Application filed May 14, 1923. Serial No. 638,714.

*To all whom it may concern:*

Be it known that I, HAROLD G. RENNER, a subject of the King of Great Britain, residing at Detroit, in the county of Wayne and State of Michigan, have invented a new and useful Rivetable Nut, of which the following is a specification.

This invention relates to screw threaded nuts and particularly to nuts adapted to be anchored in fixed position.

It is the object of the invention to provide a nut for engagement with a bolt or screw especially adapted for use in uniting sheet metal parts such as require detachable union, as in the assembly and mounting of the guards and fenders of motor vehicles and similar parts, and wherein it is necessary or desirable to secure the nut in fixed non-rotative position upon one of the parts to readily enable engagement and disengagement of the bolt or screw rotatably therewith.

In attaining this object the invention contemplates forming integral with the body of the nut a tubular axial extension adapted to serve as a riveting shank for securing the nut to a sheet metal member, and forming in the engaged face of said nut a radial groove for the reciprocation of an indenture formed in said sheet metal member to retain said nut against rotation thereon, also providing in the face of said nut a depression for the reception of the engaged portion of the sheet metal member to establish the clinch of said riveted shank flush with the opposite face of said member.

A preferred embodiment of the invention is illustrated in the accompanying drawings, in which, Fig. 1 is a perspective view of the nut.

Figure 1:
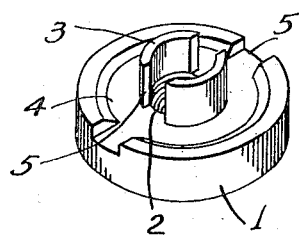
Figure 2:
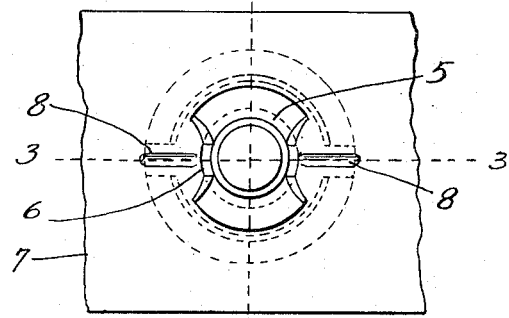
Fig. 2 is a plan view showing the clinched or riveted side of the nut as engaged with a sheet metal member.
Figure 3:
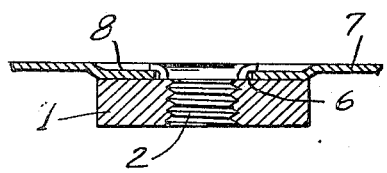
Fig. 3 is a cross sectional view taken on dashed line 3—3 of Fig. 2.
Figure 4:
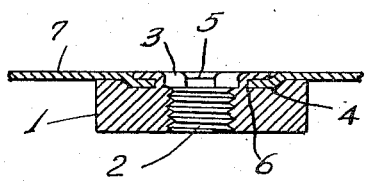
Fig. 4 is a similar view on dashed line 4—4 of Fig. 2.

In these views the reference character 1 designates the body portion or nut proper which is shown as cylindrical, but may be of any desired shape or thickness and has the usual screw threaded bore 2 for the reception of a bolt or screw (not shown). 3 is a tubular extension or shank formed integral with an end face of the nut and extending coaxial with the threaded bore, and formed in the corresponding face of the nut surrounding said shank is an annular recess or depression 4. Said shank and the marginal portion of the nut surrounding the depression 4 are slotted diametrically, as at 5, to a depth equal to the depth of said depression, as best shown in Fig. 1. The shank of the nut thus formed is adapted to be received in an aperture 6 of a sheet metal member 7, as shown in Figs. 2, 3 and 4, and the divided portions of said shank extending through said aperture serve as riveting prongs for clinching engagement with the face of said sheet metal member to anchor said nut upon the opposite face of said member. Under the clinching stress of the riveted prongs of the shank the engaged metal of the member 7 will be displaced into the depression 4 of the nut, allowing the clinched portions of said shank to lie in the plane of said member substantially flush with the face thereof, as shown in Fig. 4.

It will be noted that the slots 5 in the marginal portions of the end face of the nut engaged with the member 7 are in registering alinement with the exposed portion of the slot dividing the riveted shank so that portions of said member overlying said slots may be readily located (see Fig. 1) to enable such portions to be depressed into said slots in the form of detents or interlocking ribs 8 (see Fig. 3) and which serve to firmly retain the nut against rotation upon said shank under stresses arising from manipulation of a bolt or screw therein.

It will appear from the foregoing description that a nut thus formed may be rapidly and economically produced by comparatively simple machining operations, such as are commonly performed by automatic screw machines, and that said nut is rendered serviceable and effective for uniting sheet metal parts for various purposes.

What I claim is:

1. The combination with a member formed of sheet material and having an opening, of a nut having a threaded bore and having integral projections from one of its end faces at opposite sides of said bore, passing through said opening and bent to overlap the margin of said opening, and means restraining said nut from rotation relative to said material.

2. The combination with a member formed of sheet material and having an opening, of a nut having a threaded bore and a raised margin upon one of its end faces, and having integral projections from said end face adjacent said bore passing through said opening and clinched down upon said sheet material indenting the latter against said end face between the raised margin of said face and said projections.

3. A construction as set forth in claim 2, said margin being radially slotted and the sheet material being pressed into the radial slot to restrain the nut from rotation.

4. The combination with a member formed of sheet material and having an opening, of a nut having a threaded bore and having projections from an end face thereof at opposite sides of said bore, passing through said opening of the sheet material and clinched down upon said material, a portion of said material being indented and having an engagement with the nut, restraining the latter from rotation.

5. The combination with a member formed of sheet metal and having an opening, of a nut formed with a threaded bore and having a raised margin upon one of its end faces, diametrically slotted and having projections from said end face at opposite sides of said bore, the space between said projections registering diametrically with the slots in said raised margin, said projections passing through the opening of the sheet metal and being clinched down upon the sheet metal, the sheet metal being indented into the slots of said raised margin and the proper diametrically opposed location for the indentations being indicated by the opening between said projections.

In testimony whereof I sign this specification.

HAROLD G. RENNER.